July 29, 1930.  L. STRAUSS  1,771,589
CAKE PLATE
Original Filed March 26, 1928
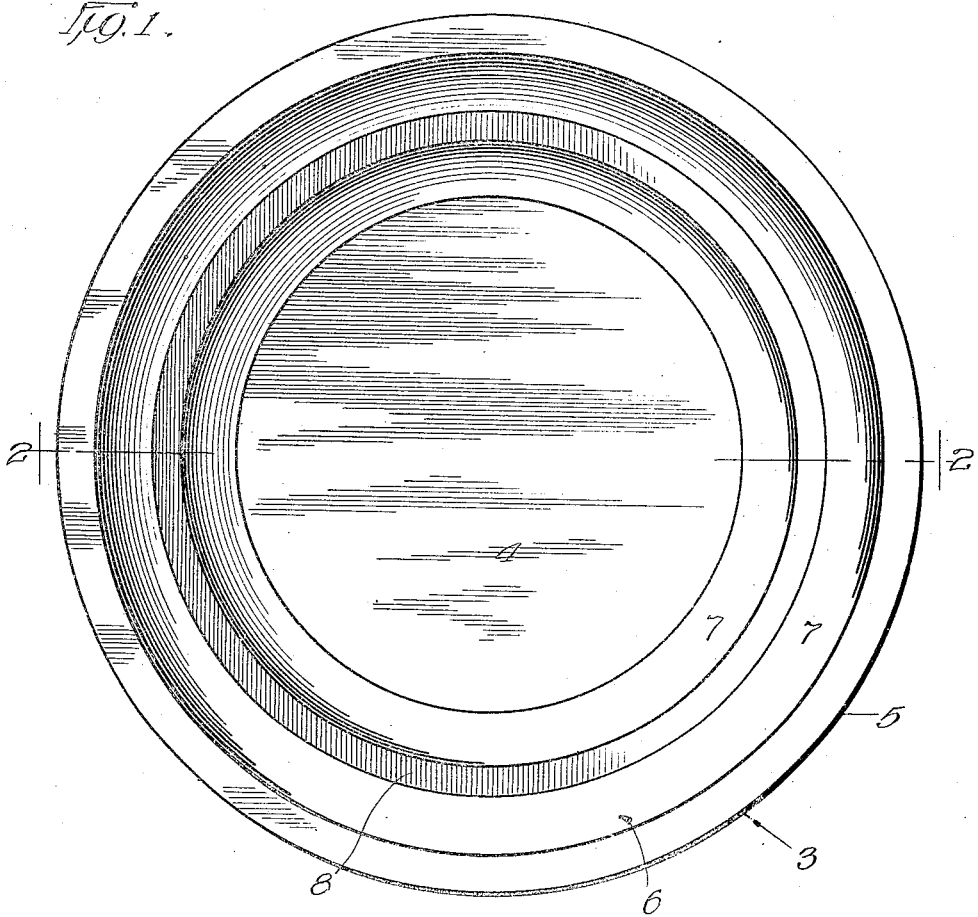
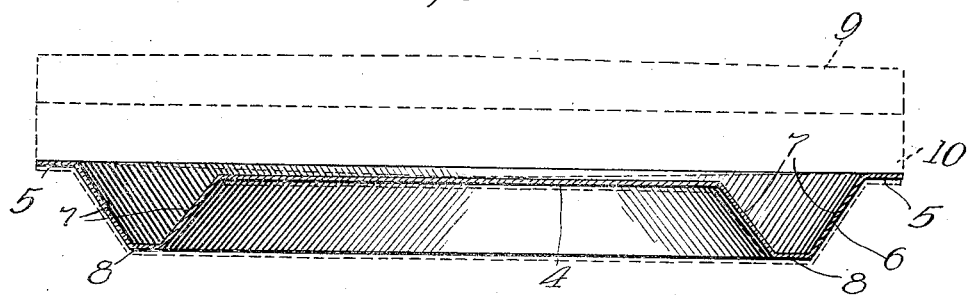
Inventor
Louis Strauss:
By J. Edwin Burch, Atty.

Patented July 29, 1930

1,771,589

UNITED STATES PATENT OFFICE

LOUIS STRAUSS, OF CHICAGO, ILLINOIS

CAKE PLATE

Application filed March 26, 1928, Serial No. 264,728. Renewed August 26, 1929.

This invention relates to a cake plate adapted to be used for supporting a cake for display and dispensing purposes. Heretofore, it has been customary to place a cake upon a pie plate or pan, but this is objectionable owing to the fact that the cake will sag in the center and appear unsightly and unpalatable as well as giving the appearance of being thin, or low.

The present invention has for its object to provide a cake plate which will support the center part of the cake and hold it in such a position that the center of the cake will be raised or bulged at the top, and also serve as an effective display support which may be used in dispensing the cake as well as in cutting the same.

With the above and other objects in view, the invention consists in a certain novel construction to be hereinafter more fully set forth.

In the accompanying drawings:

Fig. 1 is a plan view of a cake plate made in accordance with the invention, and Fig. 2 is a diametrical sectional view taken on the section line 2—2 of Figure 1.

Referring to the drawings in detail, the cake plate is designated generally at 3, and has a raised central portion 4 between which and a horizontal peripheral portion or flange 5 is disposed a V-shaped depression 6 of annular formation. All of these parts are concentric and the depressed portion 6 may be of any suitable width having inclined side walls 7 converging downwardly to the bottom portion 8, which is preferably flat as shown and constitutes a supporting surface for the plate.

The raised central portion 4 is substantially in line with the annular flange 5, but preferably slightly below it. For instance in a 9" plate it may be one-eighth of an inch below the flange, and is preferably flat. This plate is preferably made of paper pulp compressed into shape between moulds but may be made of any other suitable material, such as fibre or sheet material, such as paper or tin, though primarily it is made of paper.

In the use of the device the layers of a cake are baked and the two layers 9 and 10 with a suitable filling between are placed together so that the flat bottom portions of each layer are disposed together and the top portions are arranged so that one will rest upon the cake plate engaging the portions 4 and 5 and the other facing upwardly. Owing to the part 4 being lower than the part 5, the bulging face of the bottom layer will be accommodated and still the cake will bulge at the top instead of sinking in and will present a proper appearance. The cake will span the annular depressed portion 6, and the cake may be sold on this plate, as well as cut thereon, in which instance the raised central portion will form a desirable cutting surface, and after use the plate may be thrown away.

From the foregoing, it will be seen that I have provided a very desirable and practical form of cake plate and that various changes in the form thereof, may be made without departing from the spirit and scope of the invention. For instance, the annular portion 6 of V-shaped cross section may be of suitable width at the bottom and the central portion 4 may be at any suitable depth below the peripheral portion 5. When a cake freshly baked, is placed in a pie plate or pan, it sags down and partly hides the cake. This is particularly true with a coffee cake, which has a flat bottom, which sets flat on the pie plate and causes the center to sag in. Of course, my cake plate is especially desirable and advantageous in that the cake will be properly displayed, and will be protected from breaking as it is unsafe to wrap a cake or coffee cake without a proper support for which a pie plate will not serve. Also, the plates may be nested in or on one another as shown in Fig. 2, so as to occupy a minimum of space for storage and shipment as in connection with pie plates of paper or fiber, and can be conveniently handled with a cake on it by placing the fingers under the rim or flange 5 to lift the cake. Also, a smaller cake plate can be used which will not project out from the side of the cake as a pie plate does since in using a pie plate, the cake must set into the same, whereas my cake plate will not be seen and presents a better and more sightly appearance, without having the icing or coating smeared on the projecting edge of the plate as occurs with a pie plate.

What I claim is:

1. A plate for engaging and supporting the central and edge portions of a cake, comprising a central raised horizontal portion for engaging and supporting the central portion of the cake, an annular circular horizontal edge flange about the central portion and laterally and vertically spaced therefrom for engaging and supporting the edge portions of the cake, the central portion being slightly lower than the edge flange thereby to preserve the original contour of the upper surface of the cake and prevent either sagging or bulging, the portion of the disk between the edge flange and the central portion being annular and substantially trough-shaped in cross-section at all points and extending downwardly to form a support for the plate.

2. A plate for engaging and supporting the central and edge portions of a cake, comprising a central raised horizontal portion for engaging and supporting the central portion of the cake, a horizontal edge flange about the central portion and laterally and vertically spaced therefrom for engaging and supporting the edge portions of the cake, the central portion being slightly lower than the edge flange to preserve the original contour of the upper surface of the cake and prevent either sagging or bulging, the portion of the plate between the edge flange and the central portion being substantially trough-shaped in cross section at all points, and extending downwardly to form a support for the plate.

3. A plate for engaging and supporting the central and edge portions of a cake, comprising a central raised horizontal portion for engaging and supporting the central portion of the cake, a horizontal edge flange about the central portion and laterally spaced therefrom for engaging and supporting the edge portions of the cake, said central portion being adapted to support the slight central outward bulge of the contiguous surface thereof whereby to preserve the original contour of the upper surface of the cake and prevent either sagging or further bulging, and the portion of the plate between the edge flange and the central portion being substantially trough-shaped in cross section at all points and extending downwardly to form a support for the plate.

LOUIS STRAUSS.